June 16, 1953  L. R. HARRIS  2,641,945
MANUALLY OPERATED FENDER RESHAPING ROLLER
Filed March 15, 1947
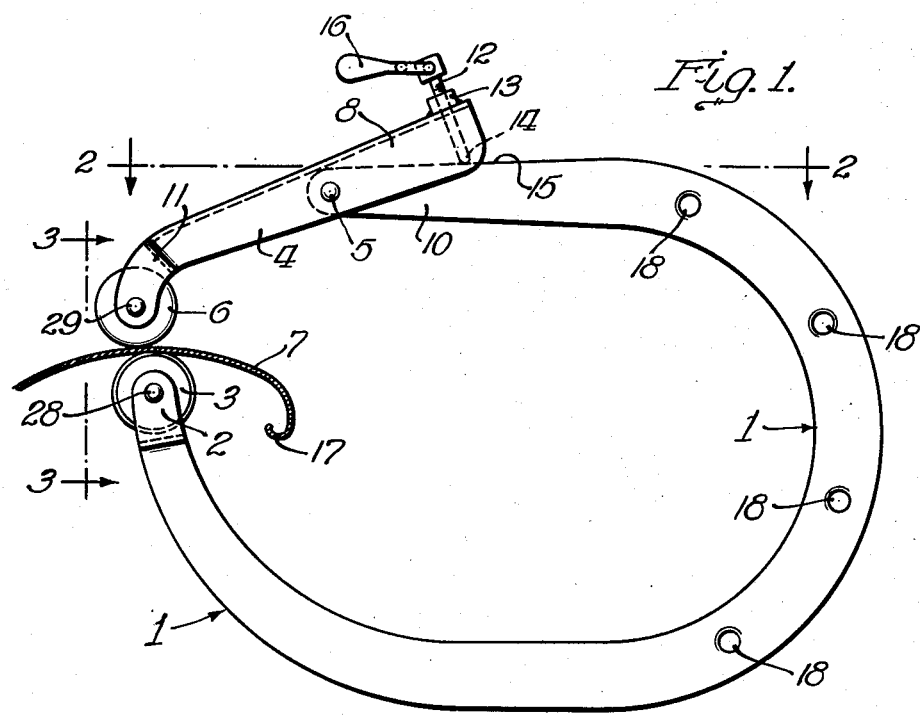
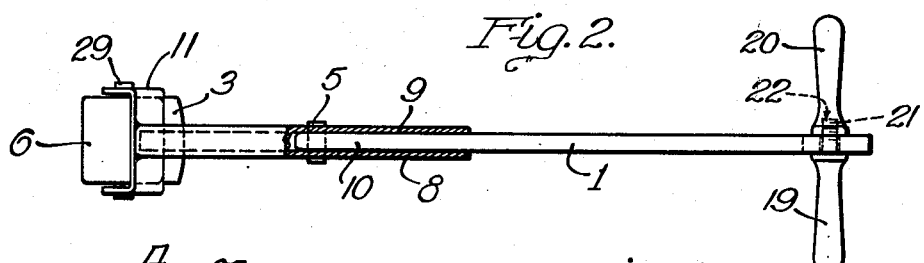
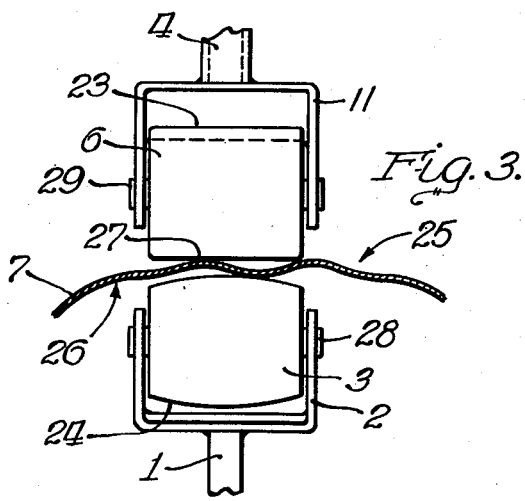
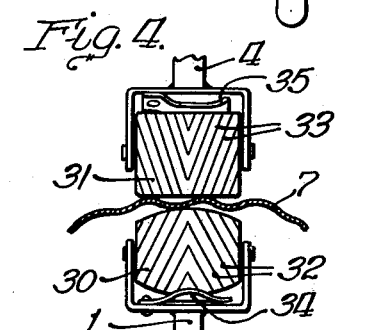
INVENTOR:-
Lawrence R. Harris
BY
Charles K Wood
Agent.

Patented June 16, 1953

2,641,945

UNITED STATES PATENT OFFICE 2,641,945

MANUALLY OPERATED FENDER RESHAPING ROLLER

Lawrence R. Harris, Vida, Oreg.

Application March 15, 1947, Serial No. 734,916

3 Claims. (Cl. 81—15)

This invention relates to a fender reshaping tool adapted for simplifying the work of straightening out dented fenders, although the use of the tool need not be limited in this respect and may be used for numerous other purposes as in the tinsmith trade.

One of the main objects of the present invention is to provide a tool that is capable of straightening dents or reshaping sheet metal or sheet steel objects through the manipulation of a pair of rollers which coact to roll out the bent or distorted metal. The operation of a tool of this type is quiet in contrast to the normal use of the anvils and blocks together with the hammers which are now commonly employed for this particular work. Furthermore, the hammering method is relatively slow and tedious while the operation of the present tool manipulating the rollers accelerates this type of work which has its obvious benefits.

Another object of the present invention is to provide a frame which is capable of positioning the rollers in a selected predetermined position with respect to each other while the frame also acts as the means by which the operator may manipulate the rollers with the use during the metal straightening operation.

It is a further object of the present invention to provide a means for tensioning the rollers, which means is adjustable at will for gradually bringing the rollers closer and closer together during the manipulation of the tool through which action the rollers steadily roll out and reshape the deformed metal portion of the piece of work.

Various sizes and shapes of coacting rollers are contemplated for use with this particular tool depending upon the conditions of operation and upon the demands of the particular job. One of the other objects of this invention is to provide a pair of coacting rollers wherein one of the rollers is relatively cylindrical in form while the other roller is curved or crowned. With the use of a pair of rollers of this type, the dents or wrinkles of a deformed sheet metal part may be worked upon with the crowned roller on the concave portion of the metal while the cylindrical roller is disposed on the convex portion of the same. The tool may be used for straightening out dents or deformations in relatively flat sheets of metal by utilizing a pair of coacting cylindrical rollers having parallel line contact with opposite sides of the metal or else the same may be slightly crowned to better accommodate this tool for that type of work.

In addition, it is also contemplated to use rollers having certain surface configurations such as ridges or grooves formed longitudinally to the surface of the rollers or at right angles to the axis thereof or still further, in herringbone fashion wherein oppositely spiral ridges may be used to effect a lateral drawing of the metal from the central portions of the rollers or in any other fashion which may best be determined through the demands of certain types of deformations as well as the inherent properties of the metal being worked upon.

All other objects and advantages relating to a fender reshaping tool of the kind herein disclosed and described shall hereinafter appear in the following detailed description of a preferred embodiment thereof having reference to the accompanying drawings which form a part of this specification.

In the drawings:

Fig. 1 is a side elevational view of the fender reshaping tool of the present invention further illustrating one position thereof while in use upon a fender;

Fig. 2 is a top view of the tool illustrated in Fig. 1 partially broken away and in section as seen substantially along the line 2—2 in Fig. 1;

Fig. 3 is an enlarged fragmentary elevational view from the roller end of the tool as applied to a fender and substantially as seen along the line 3—3 in Fig. 1; and Fig. 4 is a similar view to Fig. 3 illustrating a modified construction incorporating the use of ridged rolls.

As best seen in Figs. 1 and 2, the main body of the tool comprises a C-frame 1 terminating in a yoke 2 at one end to pivotally support a roller 3 in fixed relation with respect to the frame 1. The other end of the frame is adapted to pivotally support a bracket 4 upon a pivot pin 5, this bracket 4 pivotally supporting the roller 6 at its outer end for direct cooperation with the roller 3 on opposite sides of the fender 7 as illustrated.

The bracket 4 is fabricated from channel stock having the depending sides 8 and 9 which are spaced to straddle the flat sides of the bar stock of the frame 1 adjacent the terminal end 10 thereof. This arrangement stabilizes the bracket 4 with respect to the end 10 of the frame 1 so that the upper roller 6 which is pivotally carried by the yoke 11 that is fixedly secured to the bracket 4 is definitely controlled so that there will be no relative weaving between the rollers 3 and 6 by means of the bracket connection, the C-frame 1 being of such thickness and width to normally prevent any relative lateral weaving between the rollers through the inherent stiffness of the frame 1.

The relative spaced relation between the rollers 3 and 6 is governed by a manually operable screw 12 which threads through a threaded bushing 13 and upon the bracket 4 and the end 14 of the screw bears upon the upper surface 15 of the bracket end 10 of the C-frame 1.

In straightening out a deformed fender, the operator takes hold of the C-frame in a convenient grip and moves the same back and forth to move the rollers 3 and 6 over the dented surface of the particular piece of work such as the fender 7. The frame may be moved at right angles to the surface of the fender, diagonally with respect to such fender or substantially longitudinally, the frame 1 being of the shape shown to provide a sufficient opening in the center thereof for the necessary clearance which may be required under the actual conditions of operation thereof. As the wrinkles are slowly rolled out by the rollers 3 and 6, the clamp screw may be turned by the handle 16 decreasing the space between the rollers 3 and 6, the frame thereafter being again manipulated across the convolutions of the fender. This process may be continued until the surface of the metal being worked upon is fairly smooth and in a condition to be filed or sanded by emery cloth if this surface is to receive paint or other finishing as the case may be. Obviously, retraction of the screw 12 to a certain point will allow the rollers to be applied over the fender bead 17, thereafter tightening the handle 16 will bring the rollers into operative position upon opposite sides of the fender to be manipulated by the hand frame 1 as described.

It should be noted that the frame 1 may be manipulated in horizontal plane substantially as seen in Fig. 1 but that it is also possible by slightly tilting the frame upwardly to bring the rollers in a diagonal position on opposite sides of the fender which will also have the effect of increasing the pressure upon the deformations so that considerable rolling can be enacted before the screw 12 need be tightened in carrying out this process of straightening out fender dents or other convolutions of metallic surfaces.

The C-frame 1 may be left in a solid piece or else drilled and tapped openings 18 may be provided at various points along the frame as shown in Fig. 1. Suitable cross members may be attached at these openings to facilitate the manipulation of the tool if that is feasible and particularly where certain jobs may become tiring to the operator it is possible to provide other forms of hand grips than the body of the frame itself. As seen in Fig. 2, a pair of handles 19 and 20 are shown with the handle 19 having a threaded stud 21 of such a diameter as to fit through any one of the openings 18 for threading into a threaded socket 22 formed in the handle 20. In this manner an aligned hand grip is provided which can be used in connection with any one of the openings 18 although the threaded part of the openings is not involved in this type of fastening. However, single handles such as 19 with threaded studs such as 21 may be employed with larger diameter studs to screw or thread into any one of the openings 18 and at either side of the frame 1 to facilitate the use of other hand grip means.

Referring now to Fig. 3, it is seen that the roller 6 has a cylindrical surface 23 to present a line contact upon the fender 7 while the roller 3 is provided with a crowned surface 24 to present a surface which will also give the line contact but in a more or less spot fashion. Furthermore, the roller 6 and its cylindrical surface 23 is adapted for operation on the convex surface as generally presented at 25 upon the fender 7, while the roller 3 with its crowned surface 24 is more particularly adapted for work on the generally concave portion 26 of the fender 7. By close inspection of Fig. 3, it will be noted that the tool may also be moved generally out of a vertical plane through the manipulation of the C-frame 1, thereby bringing the rollers 3 and 6 out of direct vertical alignment to concentrate the oppositely acting pressure thereof upon certain defined convolutions such as 27 of the fender 7 during the use of the tool for the purpose for which it was designed. Attention is also directed to the fact that this tool need not be used in the specific fashion in which it is illustrated in Fig. 1 but that the entire unit may be reversed under varying conditions of operation.

Again referring to Fig. 3, it should be noted that the pivot pins 28 and 29 may be removably constructed to permit interchanging the rollers 3 and 6 or to permit the introduction and use of other shapes of rollers as contemplated by this present fender reshaping tool.

One such variation of rollers is illustrated in Fig. 4 wherein the rollers 3 and 6 have been replaced by the rollers 30 and 31 respectively. Rollers 30 and 31 have been illustrated as conforming to the general shape of rollers 3 and 6 respectively but the surfaces of such rollers are provided with herringbone ridge formations 32 and 33 formed upon the rollers for spiralling outwardly from the central portion thereof as illustrated in Fig. 4. The ridges 32 or 33 may be of such a pitch and number as to effect a slight lateral drawing of the metal under the vertical pressure of the bracket 4 and the resistance of frame 1 and during the to and fro manipulation of the frame in the same manner as previously described. This lateral drawing while rolling may be more effectively created through the use of brake means to retard the free rotation of the rollers. Fig. 4 illustrates spring members 34 and 35 stressed to suit and in engagement with each of the rollers 3 and 6 respectively to introduce one form of frictional braking means.

Thus, the simple design of the novel and inexpensive tool herein disclosed and described furnishes a quiet and feasible mechanism whereby fender dents and deformations can be reshaped in a relatively short interval of time and through a small physical effort on the part of the operator.

Changes and modifications are contemplated in the exact form, shape of the parts, and combination of the elements disclosed and described without departing from the fundamental concept of the present invention relating to the fender reshaping tool. All such modifications shall hereinafter be governed by the appended claims defining the invention as set forth.

What I claim is:

1. A fender reshaping tool comprising a frame having relatively movable arms to manipulate said tool, coacting rollers connected with said movable arms for rotation about spaced axes, means to selectively vary the spacing between said rollers while the latter engage opposite sides of fender surface deformities, and frictional braking means interposed between said rollers and said movable arms to retard the free rotation of said rolls during the movement of said arms, said braking means comprising spring members carried by said arms respectively adjacent each roller with said spring members positioned to ride in resilient frictional contact with a surface portion of said rollers respectively.

2. A fender reshaping tool comprising a frame to manipulate said tool, coacting rollers connected with said frame for rotation about spaced axes, and means to selectively vary the spacing between said rollers while the latter engage opposite sides of fender surface deformities, and yielding frictional braking means between said rollers and frame to retard the free rotation of said rolls during the movement of said frame, said rolls having ridged surface contours to aid in drawing out and rolling straight the fender deformities under the action of the retarded revolving rolls.

3. In a fender reshaping tool, a C-shaped frame, coacting rollers mounted upon transverse axis upon said frame, one of said rollers being adjustable, yielding frictional braking means between said rollers and frame, one of said rollers having sloping ridges for causing an outward expansion of metal rolled between said rollers, and handles extending from opposite sides of said frame adjacent the closed end thereof whereby the frame may be balanced by both arms of the user during a reshaping operation.

LAWRENCE R. HARRIS.

References Cited in the file of this patent

UNITED STATES PATENTS

| Number | Name | Date |
|---|---|---|
| 681,964 | Hurst | Sept. 3, 1901 |
| 1,760,467 | Asher | May 27, 1930 |
| 1,809,126 | Johnson | June 9, 1931 |
| 1,880,246 | Greiner | Oct. 4, 1932 |
| 1,911,674 | Cameron | May 30, 1933 |
| 1,951,821 | Enders | Mar. 20, 1934 |
| 2,447,162 | Conrad | Aug. 17, 1948 |

FOREIGN PATENTS

| Number | Country | Date |
|---|---|---|
| 302 | Australia | Jan. 26, 1926 |